Nov. 23, 1948.    A. L. HIGHBERG    2,454,696
ENGINE COOLING MEANS
Filed Dec. 6, 1944    2 Sheets-Sheet 1
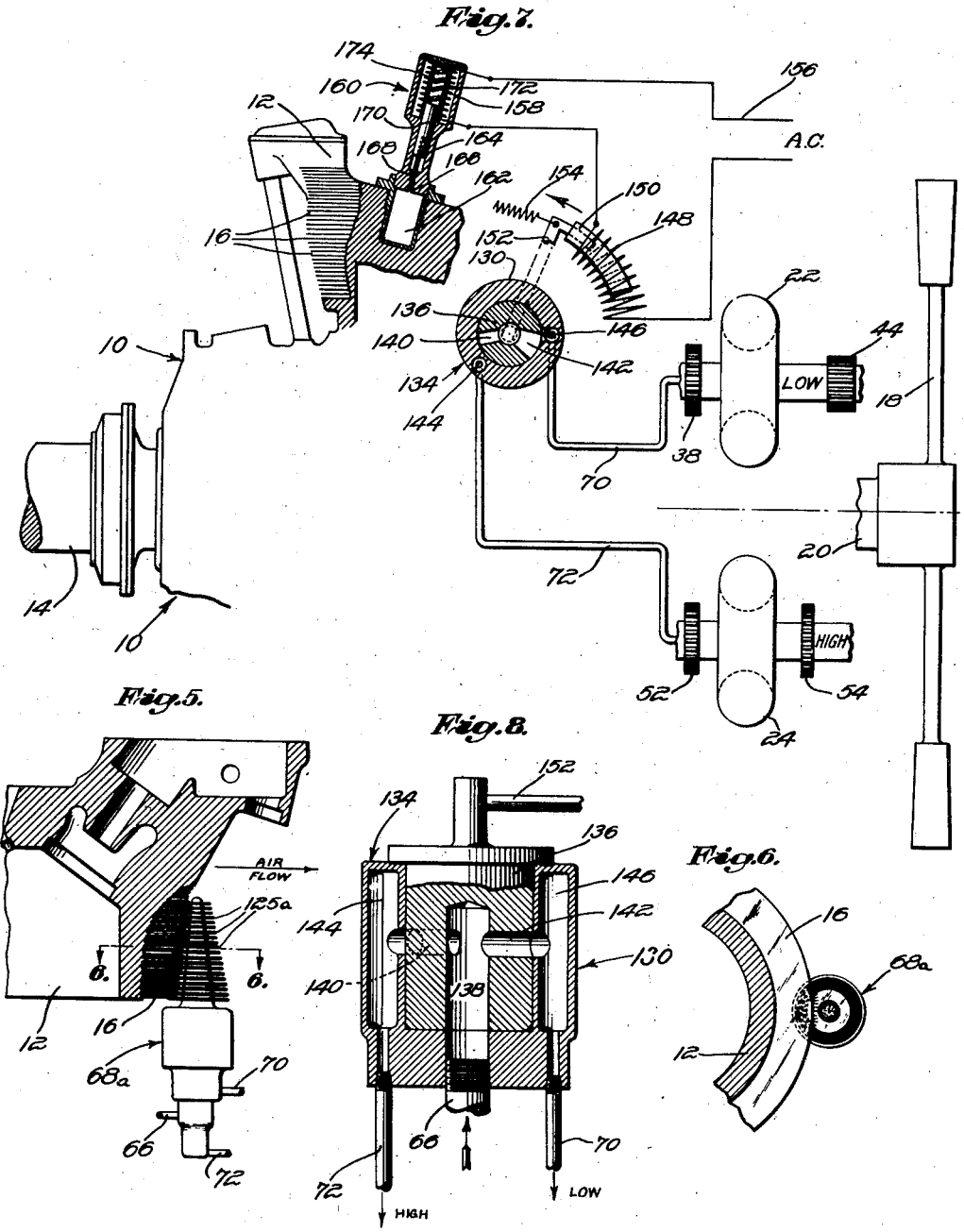
INVENTOR
Axel L. Highberg
BY Charles L. Shelton
Attorney

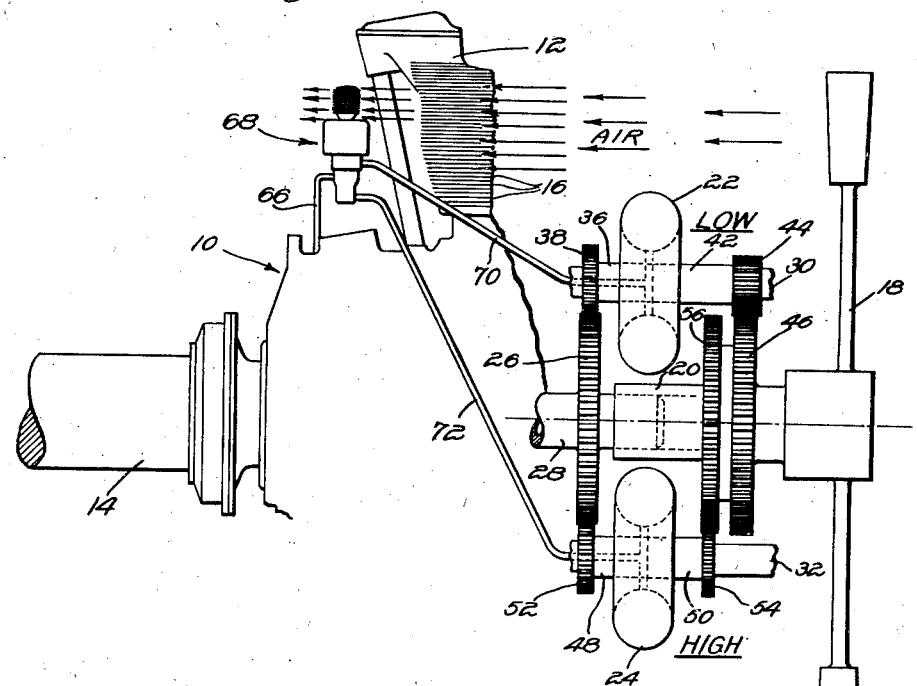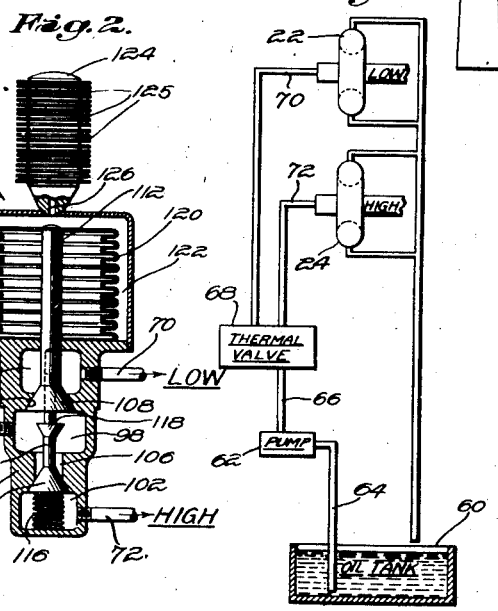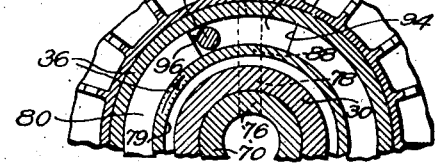

Patented Nov. 23, 1948

2,454,696

UNITED STATES PATENT OFFICE 2,454,696

ENGINE COOLING MEANS

Axel L. Highberg, West Hartford, Conn., assignor to United Aircraft Corporation, East Hartford, Conn., a corporation of Delaware Application December 6, 1944, Serial No. 566,870

3 Claims. (Cl. 123—171)

This invention relates to improvements in cooling means for internal combustion engines and relates more particularly to the cooling of internal combustion engines in airplanes.

An object of the invention is to provide improved means for controlling the speed of an engine cooling fan in accordance with cooling requirements of the engine.

Another object of the invention is to provide improved hydraulic drive means for driving an engine cooling fan by the engine at varying speeds relative to engine speed and in accordance with variations in the temperature of the engine, by which adequate cooling of the engine is provided with a minimum of engine power.

A further object of the invention is to provide improved temperature responsive means for controlling the operation of engine cylinder cooling means which is quickly responsive to changes in temperature at the hottest part of the engine cylinder.

A further object of the invention is generally to improve cooling means for aircraft engines.

Other objects and advantages of the invention will be apparent from the following detailed description of two embodiments thereof, shown in the accompanying drawings for purposes of illustration.

In these drawings,

Fig. 1 is a schematic view of an internal combustion engine having a cooling fan driven by the variable speed, thermostatically controlled drive comprising one embodiment of the invention.

Fig. 2 is a vertical section through the thermostatic valve of Fig. 1 on an enlarged scale.

Fig. 3 is a section through the low speed fluid coupling.

Fig. 3a is a section illustrating the ring valve in the low speed coupling.

Fig. 4 is a diagram of the fluid system.

Fig. 5 is a vertical section through an engine cylinder showing a modified arrangement of the thermostatic valve.

Fig. 6 is a sectional view on line 6—6 of Fig. 5.

Fig. 7 is a view similar to Fig. 1 showing a modified form of temperature control for the fluid couplings, and Fig. 8 is an enlarged vertical section through the fluid valve of Fig. 7.

The engine 10 is a conventional air-cooled aircraft engine having cylinders, one of which is shown at 12, arranged radially about a crankshaft 14 which, in the illustrated embodiments, is adapted to drive a pusher type propeller (not shown). The cylinders are provided with usual cooling fins 16 which are cooled by a stream of air from a fan 18 mounted on a shaft 20 coaxial with shaft 14.

The fan is driven at gradually varying speeds over a wide speed range through low and high speed ratio driving trains including fluid couplings 22 and 24 driven from a gear 26 on shaft 28. The shaft 28 may be driven from a source of power separate from the engine if desired, but is preferably driven by the engine 10 and may advantageously be an extension of engine crankshaft 14. The fluid couplings 22 and 24 are mounted on fixed hollow shafts 30 and 32 respectively through which working fluid is supplied to the couplings as hereinafter described.

The low speed coupling 22, shown in detail in Fig. 3 has its driving member, or impeller, 34 carried by a sleeve 36 journalled on shaft 30. This sleeve also carries a gear 38 meshing with drive gear 26. The driven member, or runner, 40 of coupling 22 is carried by a sleeve 42 journalled on shaft 30 and this sleeve is connected through a low speed gear drive 44, 46 to the fan shaft 20.

The high speed coupling is generally identical, having impeller and runner sleeves 48 and 50 respectively journalled on hollow shaft 32. Sleeve 48 also carries a gear 52 meshing with drive gear 26, while sleeve 50 is connected through a high speed gear drive 54, 56 to the fan shaft 20.

The coupling, or clutches, 22 and 24 are of the type in which the impeller and the runner are enclosed in a chamber 57 adapted to contain working fluid, and the slip between the impeller 34 which is the driving member, and the runner 40 which is the driven member, depends upon the amount of fluid present in the working chamber. The efficiency of such a coupling is a function of the slip, increasing as the slip decreases. The working chambers of couplings 22 and 24 are provided with fluid discharge passages, or drain holes, 58 and the amount of working fluid in the coupling chamber at any time, and thus the slip of the coupling and the speed of the fan 18 driven thereby, is altered by varying the amount of fluid supplied to the chamber in relation to the flow capacity of the drain passages.

Referring to Fig. 4, fluid is supplied to the couplings from a reservoir 60 by a pump 62 through lines 64 and 66 to a thermostatic valve 68 located adjacent one of the engine cylinders which controls the flow of fluid through lines 70 and 72 to the low and high speed couplings 22 and 24 respectively. The fluid lines 70 and 72 extend into the axial passages in fixed shafts 30 and 32 and are fixed thereto in fluid tight relation. Refercoupling, it will be noted that fluid line 70 has a closed end 74 and is provided with a plurality of radial passages 76 which register with similar passages 78 in the shaft 30 and through which fluid is supplied to an annular chamber 79 from which it flows to chamber 57 of the coupling.

Means must be provided to cut off the supply of fluid to chamber 57 of the low speed coupling whenever the high speed coupling 24 is being supplied with sufficient fluid to cause the runner 40 of the low speed coupling to be driven through gears 54, 56 and 46, 44 and overrun its own impeller 34. To this end the low speed coupling is provided with a ring valve 80 located in an annular recess 82 formed in the confronting ends of sleeves 36 and 42. This valve has radially disposed apertures 84 which in one angular position of the valve register with like apertures 86 and 88 in the portions of sleeves 42 and 36 which overlie the ring valve. The ring valve is provided with a recess 90 in one end thereof into which extends one end of a pin 92 carried by sleeve 36. The end walls 94 and 96 of recess 90 are so related to the ports 84 in the ring 80 and ports 86, 88 in sleeves 42, 36 that when the sleeve 36 is rotating faster than sleeve 42 the pin 92 is abutting end wall 96 and the ports are in register. However, if sleeve 42 rotates faster than sleeve 36, as when the high speed coupling is driving runner 40 and causing it to overrun its impeller 34, then pin 92 will abut end wall 94 and the ports will be out of register. It will be understood that this ring valve is omitted from the high speed coupling 24, oil being admitted directly from line 72 to the coupling chamber whenever the thermostatic valve admits oil to line 72.

The thermostatic valve 68 for controlling the admission of oil to the high and low speed couplings comprises (Fig. 2) a valve housing 97 having a central chamber 98 into which oil is delivered from the pump 62 by line 66, an upper chamber 100 from which oil is supplied through line 70 to the low speed coupling, and a lower chamber 102 from which oil is supplied through line 72 to the high speed coupling. The casing 97 has axial passages 104 and 106 controlled by valves 108 and 110 respectively. The valve 108 is rigidly fixed to a valve stem 112 guided for axial movement in the valve casing while valve 110 is carried on a short floating stem 114 having its upper end slidably received in an axial recess in valve 108 and its stem 112. A spring 116 in chamber 102 constantly biases the valve 110 upwardly into closed position in which it is maintained during a limited axial movement of valve 108 as determined by the distance between the base of valve 108 and a shoulder 118 on valve stem 114. Movement of valve 108 beyond the normal position of shoulder 118 causes valve 110 to be opened against the bias of its spring.

The valve stem 112 is attached to the upper end wall of a sealed expansible bellows 120 enclosed in a fluid tight chamber 122 located at the top of valve housing 97 and adapted to contain an expansible fluid which is critical (or vaporizes) at the optimum engine operating temperature. A second chamber 124 having heat absorbing fins 125 is mounted on the top of chamber 122 and communicates therewith through a passage 126. Chamber 124 is adapted to be at least partially filled with the expansible fluid in chamber 122. Chamber 124 may be located more remote from chamber 122, if desired, and connected thereto by means of a capillary tube, in a well known manner. In the arrangement shown the entire valve 68 is mounted at the rear of the engine cylinder 12 where it is swept over by the stream of cooling air from fan 18 after it has passed through the engine cylinder cooling fins 16. It will be noted that the heat absorber chamber 124 is located adjacent the upper portion of the cylinder where its fins 125 will be in the airstream passing by the combustion chamber of the cylinder head.

In the operation of this embodiment of the invention it will be noted that when valve 108 is caused to be initially opened by the expansion of the fluid in chamber 124, working fluid is gradually admitted from the supply line 66, chamber 98 and valve passage 104 to chamber 100 and line 70 to the low speed coupling 22. As the volume of fluid builds up in the chamber 57 of coupling 22 the runner 40 will speed up and drive the fan 18 at increasing speed until the chamber is being supplied with sufficient fluid to maintain the chamber completely filled. The coupling 22 is then operating at its greatest efficiency i. e. with minimum slip and the fan is being driven at the maximum speed it is possible to drive it in the low speed gear ratio.

As valve 108 is further depressed by the expansible fluid the shoulder 118 on valve stem 114 is engaged by the bottom of valve 108 and valve 110 is gradually opened to supply fluid in slowly increasing volume to the high speed coupling until the latter is driving the fan at full speed.

As soon as the high speed coupling begins to take over the fan drive from the low speed coupling, the runner of the latter overruns the impeller and, due to the frictional engagement of sleeve 42 with the ring valve 80 the latter is caused to overrun the sleeve 36, bringing the pin 92 into engagement with wall 94 of the recess 90. In this position of the valve 80 the ports 88 and 86 are out of register with port 84 in the valve and the low speed coupling being no longer supplied with oil soon drains through passages 58.

Thus in each of the low and high speed gear ratios the speed of the fan 18 is varied by controlling the amount of oil admitted to the couplings, through valve 68 to that amount necessary to drive the fan at a speed just sufficiently high to maintain the engine cooled to the optimum temperature.

In Figs. 5 and 6 a somewhat modified construction and arrangement of thermostatic valve is shown in which the valve indicated at 68a is located in the cooling airstream on the downstream side of the engine cylinder 16 with its cooling fins 125a projecting into the interfin spaces between the cylinder fins 16. Further, as shown in these figures, the fins 125a on the heat absorber chamber of the valve are united to the engine cylinder fins 16 at their mutually overlapping surfaces, as by brazing or welding, so that the metal of the fins 125a is in direct heat conducting contact with the engine cylinder fins 16 at the hottest part of the cylinder 12. As shown, the fins 125a are of diminishing diameter to correspond with the increasing diameter of the cylinder fins 16 toward the top of the cylinder to provide for a uniform overlap of the interleaved fins.

With such an arrangement, the valve will be actuated in accordance with changes in cylinder head temperature by direct heat conduction from the head through the cylinder fins 16 to the valve fins 125a, even though the cooling air temperature and rate of flow may not have changed. It will also be actuated by direct conduction from the cooling airstream flowing through the fins 125a in response to changes in cooling air temperature and rate of flow, even if there has been no change in cylinder head temperature.

Fig. 7 shows a modification of thermally controlled valve for supplying oil in the desired sequence of volume to the couplings in accordance with engine temperature, 130 designates the generally cylindrical housing of a rotary valve generally indicated at 134 in which a radially ported axial valve member 136 is rotatable. Member 136 has an axial inlet chamber 138 (Fig. 8) supplied by line 66 from pump 62 and radial ports 140 and 142 communicating with axial chamber 138. Port 140, in certain angular positions of valve 136, registers with an outlet chamber 144 and line 72 to the high speed coupling, while port 142, which is approximately twice as wide at its outer end as port 140, registers with an outlet chamber 146 and line 70 to the low speed coupling, the angular relation of these ports 140 and 142 being such that the former remains closed while the latter is moving from fully closed to open position and the latter remains open while the former is being gradually uncovered during further opening movement of the valve to supply oil first gradually and in increasing amounts to the low speed coupling and then gradually to the high speed coupling.

The axial valve member 136 is actuated by a solenoid 148 having a core 150 operatively connected with member 136 by an arm 152 which is constantly biased by a spring 154 to withdraw the core from the solenoid in the direction of the arrow in Fig. 7. The alternating current circuit 156 for solenoid 148 also includes a variable inductance having a coil 158 associated with a thermoresponsive device generally indicated at 160 which includes a chamber 162 containing an expansible fluid and inserted in a recess in the cylinder head of engine cylinder 12. An enclosing housing 164 has a passage 166 communicating with said chamber in which a piston 168 is reciprocable to control the movement of a soft iron core 170 into and out of the coil 158. The core 170 is reciprocable in an axial passage 172 which contains a compression spring 174 constantly urging the core 170 downwardly out of the coil 158.

As the fluid in chamber 162 expands with increasing temperature of cylinder 12 the core 170 is moved into coil 158, causing the inductance of circuit 156 to be gradually increased and consequently causing a gradual decrease in current flowing in the circuit. This decrease in current flow through solenoid 148 enables spring 154 to move core 150 correspondingly out of solenoid 148, causing valve member 136 to gradually move port 142 into register with outlet chamber 146 and supply oil in increasing quantity to the low speed coupling. Just as the port 142 and chamber 146 come into complete register, the port 140 begins to register with chamber 144 to supply the high speed coupling. Thus as the temperature of the engine cylinder increases, additional oil is supplied, first to the low speed coupling and then to the high speed coupling to drive the fan 18 at gradually increasing speed in accordance with the cooling requirements of the engine.

As a result of this invention it will be evident that means has been provided for controlling the speed of an engine cooling fan over a wide range by varying cooling fan speeds relative to engine speed in accordance with variations in engine temperature, whereby adequate cooling of the engine is provided with a minimum of power expended for driving the cooling fan.

It will also be evident that improved temperature responsive means has been provided for controlling an engine cooling fan which is exceedingly responsive to changes in engine cylinder temperature at the hottest part of the cylinder.

While certain specific embodiments of the invention have been shown, it will be understood that various changes may be made in the construction and arrangement of the parts without exceeding the scope of the invention. For example, in place of the solenoid and variable inductance of Fig. 7 two "Autosyn" or "Selsyn" units may be used to electrically couple the temperature responsive piston 168 with the valve element 136 to provide movement of the valve member in proportion to movement of the thermally responsive member.

What I claim as new and desire to secure by Letters Patent is:

1. In an internal combustion engine having a cylinder provided with cooling fins and having a variable speed fan for moving a stream of cooling air through said fins, thermostatic means for controlling the speed of the fan including a heat absorbing chamber containing a temperature expansible fluid and located in the cooling stream set up by the fan, said heat absorbing means being located in the lee of the cylinder relative to said cooling air stream and having external heat conducting fins the adjacent peripheral portions of which are interleaved with the cooling fins of the cylinder.

2. The combination claimed in claim 1 in which the mutually interleaved fin portions of said heat absorbing means and the engine cylinder are united in good heat conducting relation.

3. In an internal combustion engine having a cylinder provided with spaced cooling fins and having a variable speed fan for moving a stream of cooling air through said fins, thermostatic means controlling the speed of the fan disposed in said air stream on the down stream side of the cylinder and including a heat absorbing chamber containing a fluid expansible over the operating temperature range of the engine, said chamber having external heat conducting fins which are swept over by the air stream leaving the cylinder, whereby said thermostatic means is responsive to temperature changes or changes in rate of flow of said air stream while the temperature of the cylinder remains unchanged, and said external fins of said chamber and the cylinder fins having mutually interleaved portions connected in good heat conducting relation, whereby said thermostatic means is responsive to changes in cylinder temperature while the temperature and rate of flow of said air stream remain unchanged.

AXEL L. HIGHBERG.

REFERENCES CITED

The following references are of record in the file of this patent:

UNITED STATES PATENTS

| Number | Name | Date |
| --- | --- | --- |
| 1,043,344 | Newman | Nov. 5, 1912 |
| 1,192,995 | De Lay | Aug. 1, 1916 |
| 1,256,709 | Ludeman | Feb. 19, 1918 |
| 1,433,399 | Modine | Oct. 24, 1922 |
| 1,934,783 | Arterburn | Nov. 14, 1933 |
| 2,337,075 | Watson | Dec. 21, 1943 |
| 2,382,520 | Benz et al. | Jan. 8, 1946 |